United States Patent
Kuang et al.

(10) Patent No.: US 9,551,140 B2
(45) Date of Patent: Jan. 24, 2017

(54) DRYER COMPONENT

(75) Inventors: Qifeng Kuang, Shanghai (CN); Erich D. Slothower, Mill Valley, CA (US)

(73) Assignee: SHANGHAI KOHLER ELECTRONICS, LTD. (CN)

( * ) Notice: Subject to any disclaimer, the term of this patent is extended or adjusted under 35 U.S.C. 154(b) by 1163 days.

(21) Appl. No.: 13/473,510

(22) Filed: May 16, 2012

(65) Prior Publication Data

US 2012/0285034 A1 Nov. 15, 2012

Related U.S. Application Data

(63) Continuation-in-part of application No. PCT/CN2010/078805, filed on Nov. 16, 2010.

(30) Foreign Application Priority Data

Nov. 17, 2009 (CN) .......................... 2009 1 1000218

(51) Int. Cl.
- *A47K 3/022* (2006.01)
- *E03D 9/08* (2006.01)
- *A47K 11/02* (2006.01)
- *F24H 3/04* (2006.01)

(52) U.S. Cl.
CPC ................. *E03D 9/08* (2013.01); *A47K 11/02* (2013.01); *F24H 3/0405* (2013.01)

(58) Field of Classification Search
CPC .................................. E03D 9/08; E03D 9/085
USPC ....................... 4/420.2, 420.4, 443
See application file for complete search history.

(56) References Cited

U.S. PATENT DOCUMENTS

| 2,344,561 | A | | 3/1944 | Popil |
| 4,028,745 | A | * | 6/1977 | Caniglia ................... E03D 9/08 4/420.2 |
| 4,558,473 | A | | 12/1985 | Morikawa et al. |
| 4,704,748 | A | | 11/1987 | Takeda et al. |
| 5,050,249 | A | | 9/1991 | Takeda et al. |
| 5,241,712 | A | | 9/1993 | Mahoney |
| 5,272,774 | A | | 12/1993 | Ivko et al. |
| 5,960,484 | A | | 10/1999 | Shao |

(Continued)

FOREIGN PATENT DOCUMENTS

| CN | 2173287 | 8/1994 |
| CN | 2307054 | 2/1999 |

(Continued)

OTHER PUBLICATIONS

Taiwan Office Action regarding Application No. 099139104 issued Aug. 22, 2013.

(Continued)

*Primary Examiner* — Huyen Le
(74) *Attorney, Agent, or Firm* — Foley & Lardner LLP

(57) ABSTRACT

A dryer component for a bidet includes a drying member (40), a blower component (50) and a pipe component (70). The pipe component (70) includes a first separable part (72) and a second separable part (82) so as to provide fluid connection between the blower component (50) and the drying member (40). There is no hose used in the pipe component (70) and the fitting surface between the first part (72) and the second part (82) is tilted, which allows comparatively great fitting tolerances of members of the dryer.

21 Claims, 11 Drawing Sheets

(56) References Cited

U.S. PATENT DOCUMENTS

| | | | |
|---|---|---|---|
| 6,769,140 B1 * | 8/2004 | Olivier | E03D 9/08 4/420.2 |
| 6,782,562 B1 | 8/2004 | Aono | |
| 6,959,459 B2 | 11/2005 | Takenaga | |
| 7,096,518 B2 * | 8/2006 | Takenaga | E03D 9/08 4/420.2 |
| 2002/0073483 A1 | 6/2002 | Nofal | |

FOREIGN PATENT DOCUMENTS

| | | |
|---|---|---|
| CN | 2313982 | 4/1999 |
| CN | 2542753 | 4/2003 |
| CN | 2719955 | 8/2005 |
| CN | 2751083 | 1/2006 |
| CN | 1997798 | 7/2007 |
| CN | 2009/70194 | 11/2007 |
| CN | 2007/10199074 | 12/2007 |
| CN | 201148662 | 11/2008 |
| CN | 201212179 | 3/2009 |
| JP | 61-137244 | 6/1986 |
| JP | 61-239620 | 10/1986 |
| JP | S63-113537 | 3/1990 |
| JP | 02-144748 | 6/1990 |
| JP | H2-274930 | 11/1990 |
| JP | 03-240472 | 10/1991 |
| JP | 06-146376 | 5/1994 |
| JP | 08027864 | 1/1996 |
| JP | 08302794 | 11/1996 |
| JP | 10-237926 | 9/1998 |
| JP | 2000-80707 | 3/2000 |
| JP | 2003-147839 | 5/2003 |
| JP | 2006-104924 | 4/2006 |
| JP | 2006/125193 | 5/2006 |
| JP | 2007-205141 | 8/2007 |
| JP | 2007/205141 | 8/2007 |
| JP | 2007205141 | 8/2007 |
| TW | 331346 | 5/1998 |
| TW | 331347 | 5/1998 |
| TW | 1322213 | 3/2010 |
| WO | WO00/29681 | 5/2000 |
| WO | WO 01/36758 | 5/2001 |
| WO | WO2006/079232 | 8/2006 |

OTHER PUBLICATIONS

International Search Report regarding PCT/CN2010/078805 dated Feb. 24, 2011.
First Office Action regarding Chinese Application. 2009/11000218.2 issued Jul. 17, 2013.
Office Action in related Japanese Application No. 2012-538184 mailing date Jul. 30, 2013.
First Office Action in related Chinese Application No. 200911000217.8 issuing date Jun. 26, 2013.
Supplementary Partial European Search Report dated Apr. 5, 2015, 7 pages.
Japanese Application No. 2012-538185 Office Action mailed Jul. 30, 2013.
Search Report in related Taiwan Application No. 099139103.
Notification Concerning Transmittal of International Preliminary Report on Patentability (Chapter 1 of the Patent Cooperation Treaty) in PCT/CN2010/078803.

* cited by examiner

DRYER COMPONENT

CROSS-REFERENCE TO RELATED APPLICATIONS

This application is a continuation in part of International Application PCT/CN2010/078805, filed Nov. 16, 2010, incorporated herein by reference in its entirety, which claims priority from Chinese Application No. 200911000218.2, filed Nov. 17, 2009, incorporated herein by reference in its entirety.

FIELD OF THE INVENTION

The present invention relates to a dryer component for a bidet or bidet toilet. The dryer component includes a drying member, a blower component and a pipe component. The present invention in particular relates to a dryer component used for toilet/bidet.

BACKGROUND OF THE INVENTION

The prior art includes U.S. Pat. No. 4,558,473. Such patent relates to the bidet system provided with a fixed wand which is used for sanitary cleaning Adjacent to the wand is an independent fixed air duct which is used for blowing hot air. The fan blows the air into the air duct, wherein a heating unit is installed. Such heating unit is used for heating the air which flows through the air duct into the bidet. U.S. Pat. No. 5,960,484 describes a toilet equipment including a water emitting tube. The water emitting tube extends and retracts in an arcuate path. This patent discloses an embodiment, wherein the water emitting tube extends out by manually exerting pressure on the handle which is connected to the tension spring. In this way the water emitting tube can be forced to retract to its original position under the spring's offset force after the pressure on the handle is relieved.

U.S. Pat. No. 4,028,745 relates to a system for flush toilet cleaning and drying. This device provides hot water for the liquid injection outlet and provides air for a separate air guiding outlet. The blower makes the air flow past the airflow pipeline connected with the tubular member. Lifting rod fastens pivotally to a tubular member. Such scheme allows liquid injection outlet and air guiding outlet to rotate between the storage position and usage position. This patent describes an embodiment, wherein the blower with a heating element therein heats the air.

Other prior art includes the following: The Chinese patent application publication No. 200710199074.2, which is suitable for toilet system and equipped with a hot air pipe with three branches. One of such three branches heats the toilet seat; the second branch heats the room wherein the toilet is installed; and the third branch is led to the toilet bowl. The Japanese patent No. 2007-205141, which describes a warm air dryer provided with a pipeline connected to a warm air source. The reciprocating drying nozzle can extend out to the usage position and retract to the storage position. When the drying nozzle is in an extended position the rear part of the drying nozzle is provided with an opening connected with an air pipe and when the drying nozzle is in a retracted position the rear opening of the drying nozzle is not connected with the air pipe.

SUMMARY OF THE INVENTION

Embodiments of the present invention meet the need of providing a hoseless and separable air pipe component. Furthermore, this method provides tilted fitting surfaces between the separable parts of the air pipe members.

An aspect or embodiment of the present invention relates to an improved dryer component. The improved dryer component includes a drying member, a blower component and a pipe component. This invention includes the separable parts of a pipe component, with each part provided with a fitting surface mirroring the fitting surface of another part. For example, the pipe component can allow the optimal fluid connection when each part is fitted with each other and restrict fluid connection when each part separates from each other.

According to another aspect or embodiment of the invention, the connection between the blower component and the drying member is hoseless. One part of the pipe component is connected to the blower component while the other part of the pipe component is connected to the drying member. These separable parts allow retracting of the drying member without the need of moving or bending a flexible hose. Therefore the movement of parts can be simplified and the wear can be minimized.

In another aspect or embodiment, the fitting surface of each part of the pipe is tilted. Said tilted fitting surfaces advantageously allow the minimum possible force to separate or fit pipe parts in assembling process. The tilted (e.g., angled) surfaces can also reduce the catching or hanging of pipe parts to the least possibility. These tilted fitting joints advantageously do not need precise alignment, which allows comparatively great alignment tolerance between the drying member and the blower component. For example, the drying member can slightly deviate or loosen, however, when the drying member extends out, each part of the pipe component basically aligns so as to provide fluid connection with the drying member.

At least one embodiment of the present invention is aimed at providing a drying component including a blower component and a pipe component. Such pipe component includes a first separable part and a second separable part. Said first part and said second part are respectively connected by first and second fitting surfaces, and such connection is demountable, thereby providing a selectable fluid connection between the blower component and the drying member.

In some embodiments of the invention, the first fitting surface and the second fitting surface are tilted (e.g., angled relative to the axis of the pipe). In other embodiments of the invention, the drying member is a bidet wand. In addition, in some embodiments of the invention, the drying member is an arcuate (e.g., curved) wand. In another embodiment of the invention, the drying member further includes a liquid injection member.

In some embodiments of the invention, the first part and the second part are substantially rigid. Some embodiments of the invention further includes a heating element. Some embodiments of the invention includes a driving device. The driving device can be configured to cause at least one of the first part and the second part to be moved to a position wherein the first part and the second part of the pipe are in fluid connection. In some embodiments, the driving device is a manually operated device. In other embodiments of invention, the driving device is a motor. In yet other embodiments of the invention, the driving device is an actuator.

DETAILED DESCRIPTION OF THE PREFERRED EMBODIMENTS

Figure 1:
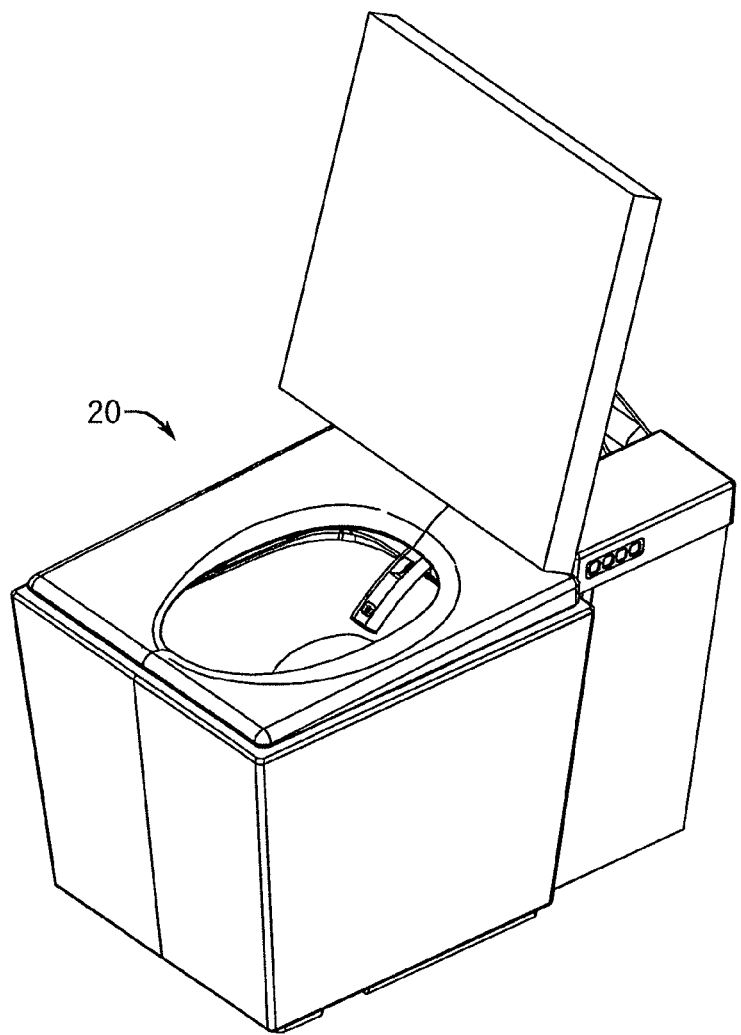
FIG. 1 is a perspective view of a bidet.
Figure 2:
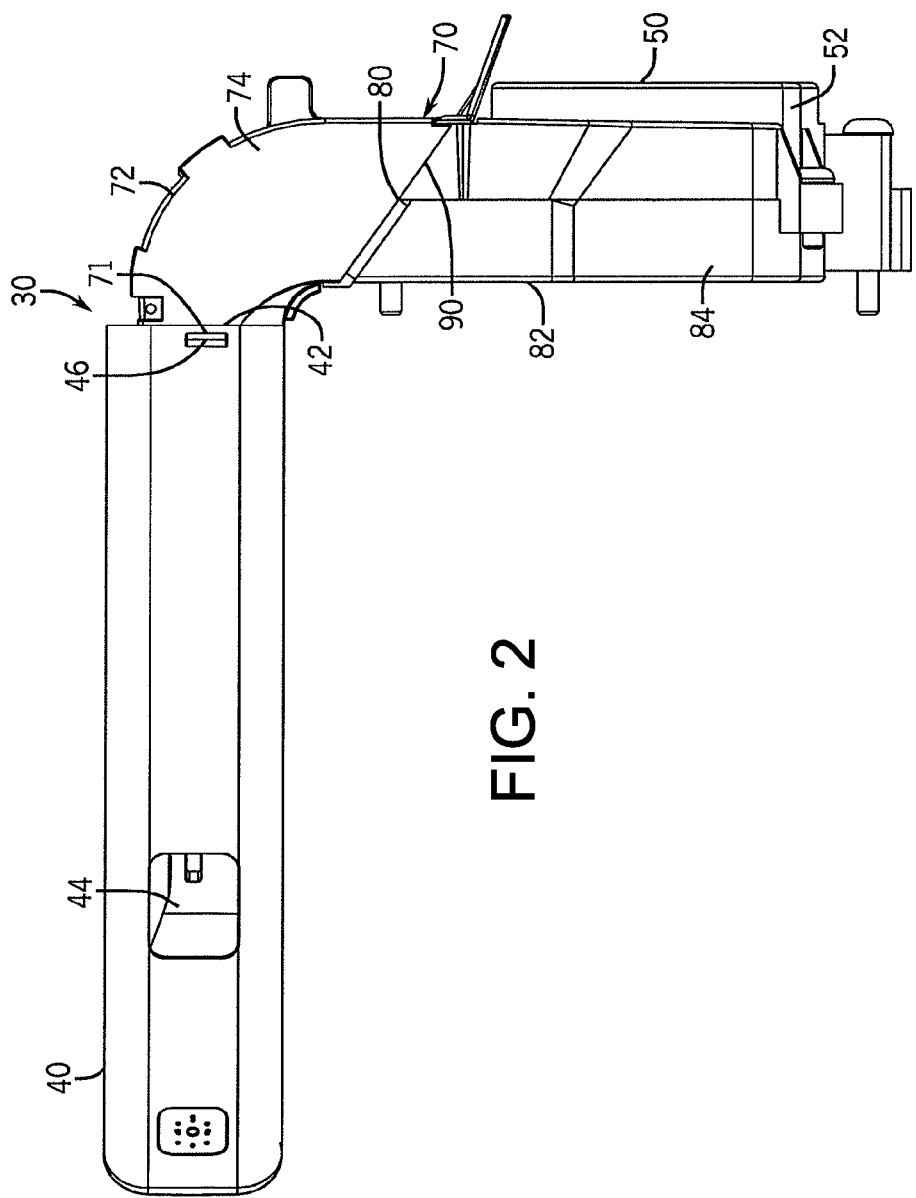
FIG. 2 is a plan view of an embodiment of a dryer component.

FIG. 1 shows a bidet 20. FIG. 2 shows an embodiment of a dryer component 30. A dryer component 30 includes a drying member 40, a blower component 50 and a pipe component 70. The drying member 40 can move between a first position and a second position. For example, the drying member 40 can be a bidet wand which can be provided with an extended position and a retracted position. In varying embodiments, the drying member 40 can have a fixed position or a plurality of extended positions. A part of the drying member 40 defines an inlet 42 while another part of the drying member defines an outlet 44. When dryer component 30 is in operation, a fluid connection is utilized between the inlet 42 and the outlet 44. For example, the air can flow from the inlet 42 to the outlet 44 in order to dry certain body part of the user.

Figure 3:
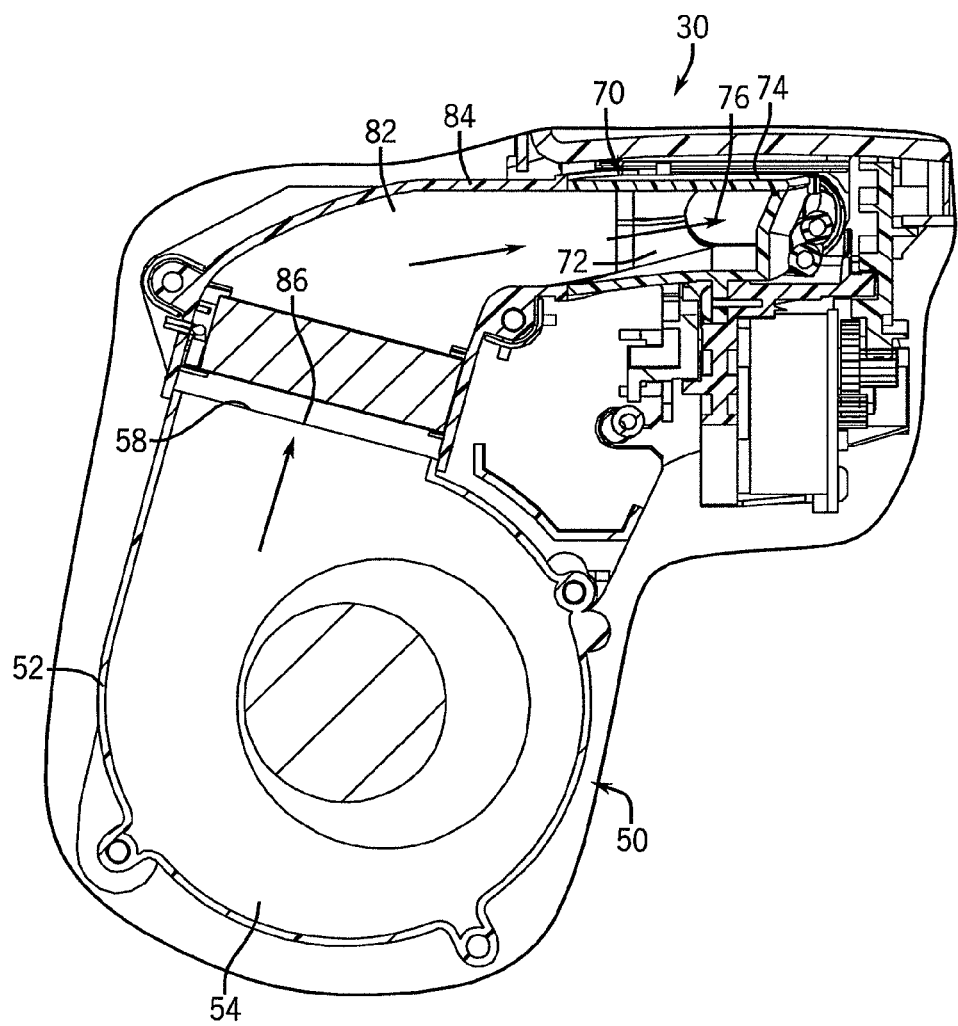
FIG. 3 is a partial, sectional perspective view of the dryer component as illustrated in FIG. 2.
Figure 4:
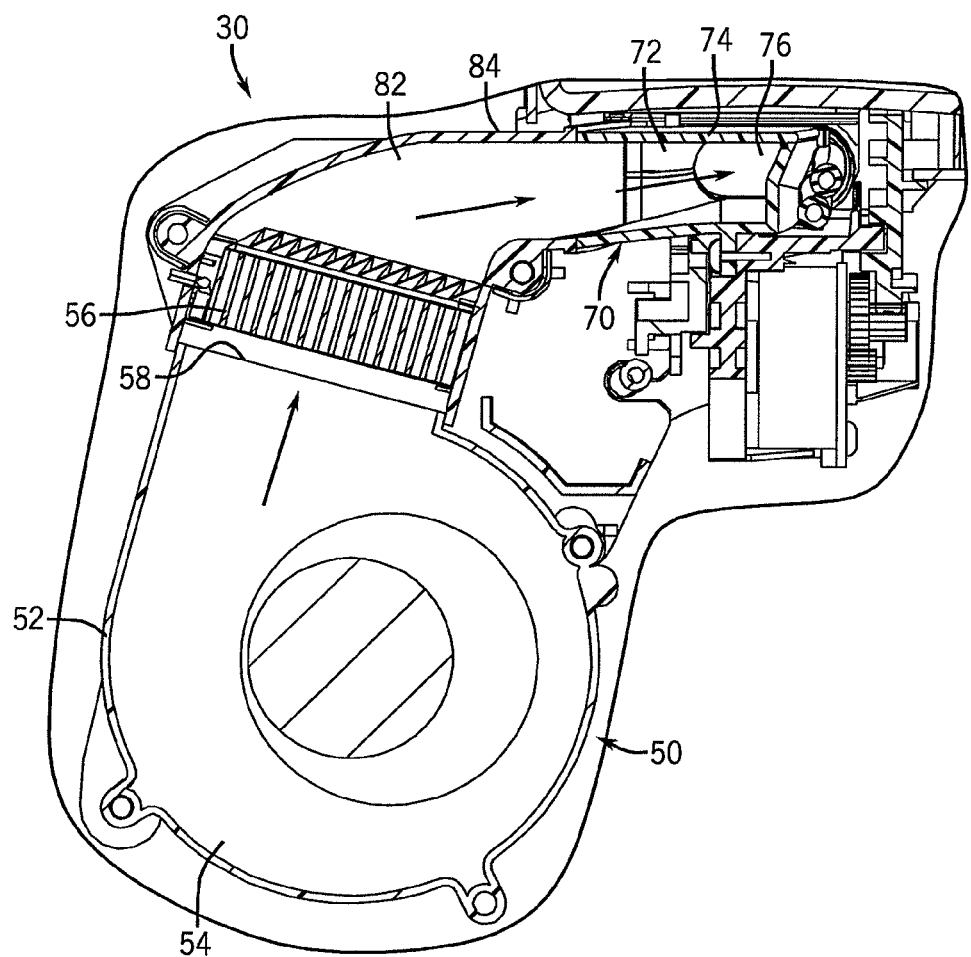
FIG. 4 is a partial, sectional perspective view of another dryer component.

FIG. 3 shows a blower component 50. As shown, blower component 50 includes a blower shell 52 and an interior gas flow source like a blower 54. The blower component 50 can optionally be a channel which allows fluid connection from exterior sources like a heating pipe adapted for other devices or a blower. The blower 54 can be any type of gas-moving device such as a fan or a turbine. In the illustrated embodiment, the blower 54 produces gas moving and blows the air out of the blower outlet 58. As shown in FIG. 4, drying component 30 can optionally include a heating element 56 such as an electric heating coil. When the gas is driven through the blower outlet 58 and flows past heating element 56, the gas becomes warm.

Figure 5:
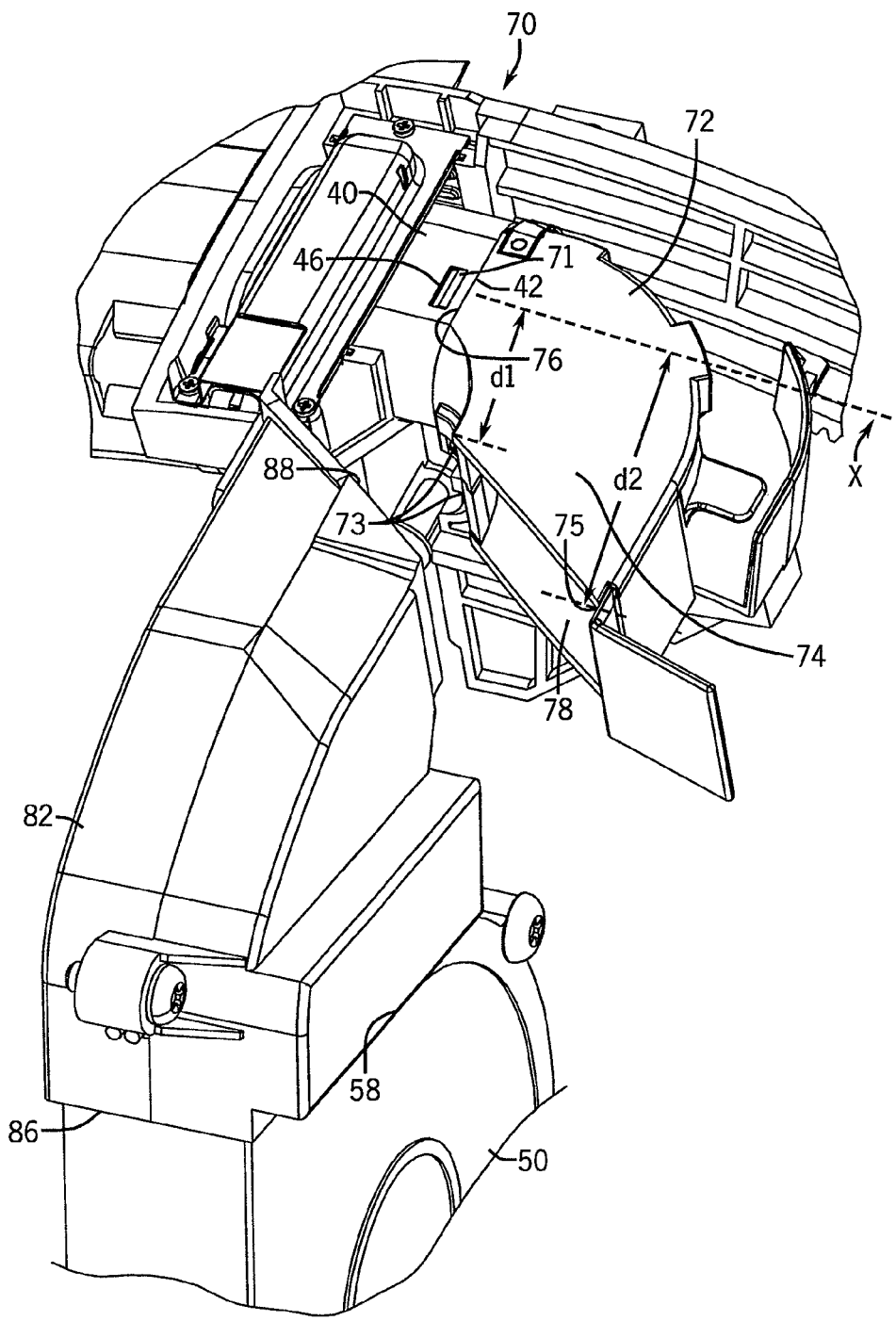
FIG. 5 is a partial perspective view of the dryer component as illustrated in FIG. 2.
Figure 6:
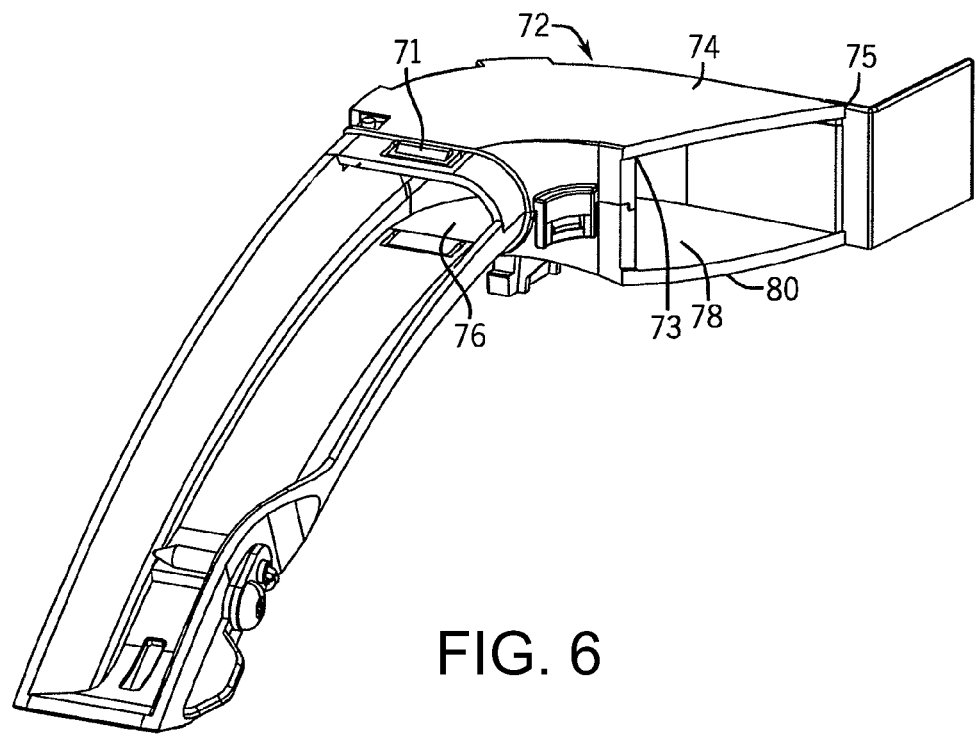
FIG. 6 is a partial perspective view of a pipe component.

FIG. 5 shows an embodiment of a pipe component 70. Such pipe component 70 includes a first part 72 and a second part 82. The first part 72 is connected to a drying member 40 (e.g., as also shown in FIG. 2) at inlet 42 by means of any type of connection (e.g., a screw, bolt, nipple, tab, adhesive or friction fitting, etc.). In the illustrated embodiment, the first part 72 is connected to the drying member 40 via tab 71, and the tab 71 is fitted in a tab socket 46 on the drying member 40. The first part 72 is provided with a first shell 74. The size and shape of the first opening 76 of such first shell 74 is set to be able to fit the inlet 42 in order to provide fluid connection with the inlet 42. The size and shape of the first part 72 is set as being fitted into the inlet 42 and such first part 72 includes at least one tab 71. The size and shape of the second opening 78 of the first shell 74 is designed to be able to fit the second part 82. The first opening 76 and the second opening 78 can be of any type of section shape, such as rectangular, circular or oval. In the embodiment shown, the first opening 76 is provided with a substantially oval section while the second opening 78 is provided with a rectangular section. The first fitting surface 80 (as referenced in FIGS. 2 and 6) is defined by the outermost peripheral surface of the second opening 78. The first fitting surface 80 can be the outermost peripheral surface of the first shell 74, such as a washer or coating material. The distance from the first point 73 of the first fitting surface 80 to the central axis x of the drying member 40 is illustrated by d1. The distance from the second point 75 of the first fitting surface 80 to the central axis x of the drying member 40 is d2. The first distance d1 can be equal to, shorter or longer than the second distance d2. In the embodiment shown, the first distance d1 is shorter than the second distance d2, and therefore the first fitting surface 80 is tilted away from the central axis x.

Figure 7:
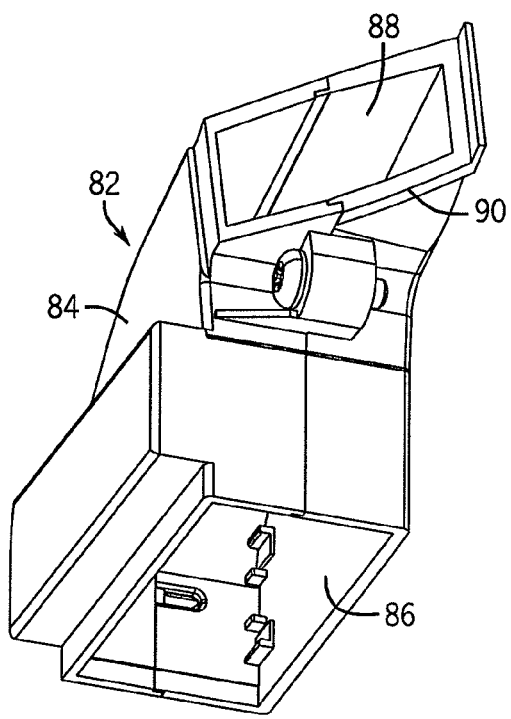
FIG. 7 is another partial perspective view of a pipe component.

The second part 82 is connected to a blower component 50 at the blower outlet 58 by means of any type of connection (e.g., a screw, bolt, nipple, tab, adhesive or friction fitting). The second part 82 is provided with a second shell 84 (e.g., referenced in FIGS. 2 and 7). The size and shape of the third opening 86 of the second shell 84 is set to be able to fit the blower outlet 58 in order to provide fluid connection from the blower component 50 to the second part 82. The size and shape of a fourth opening 88 of the second shell 84 is designed to be able to fit the first part 72. The third opening 86 and the fourth opening 88 can be of any type of cross-sectional shape, such as rectangular, circular or oval. In the embodiment shown, the third opening 86 and the fourth opening 88 are provided with a rectangular cross section. The second fitting surface 90 is determined by the outermost peripheral surface of the fourth opening 88. The second fitting surface 90 can be the outermost peripheral surface of the second shell 84, such as the washer or the coating material. The size and shape of the second fitting surface 90 is designed as being fitted with the first fitting surface 80. In the embodiment shown, the second fitting surface 90 is tilted to mirror the first fitting surface 80 in order to provide optimal assembling when the first part 72 and the second part 82 are connected with each other.

Figure 8:
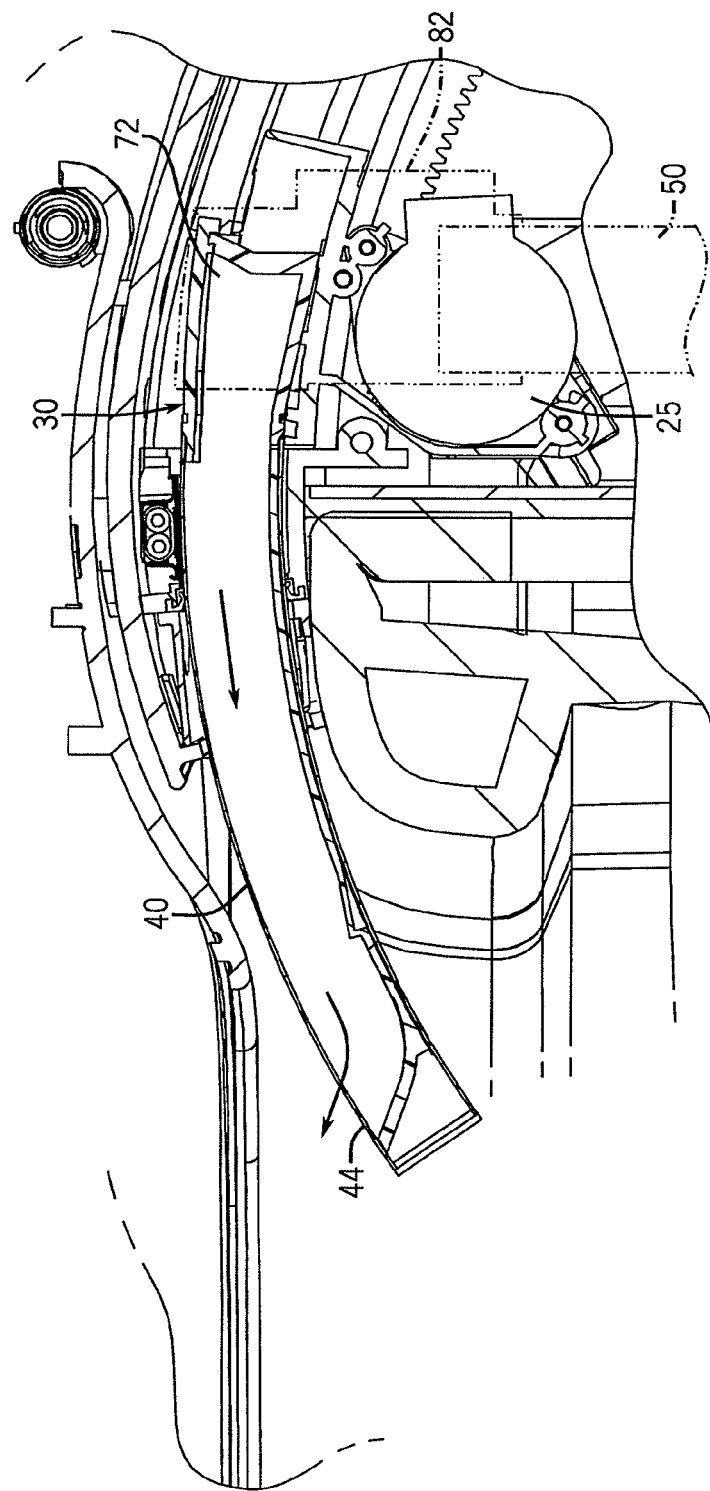
FIG. 8 is a partial, side sectional view of a bidet, including the dryer component as illustrated in FIG. 2 in the extended position.
Figure 10:
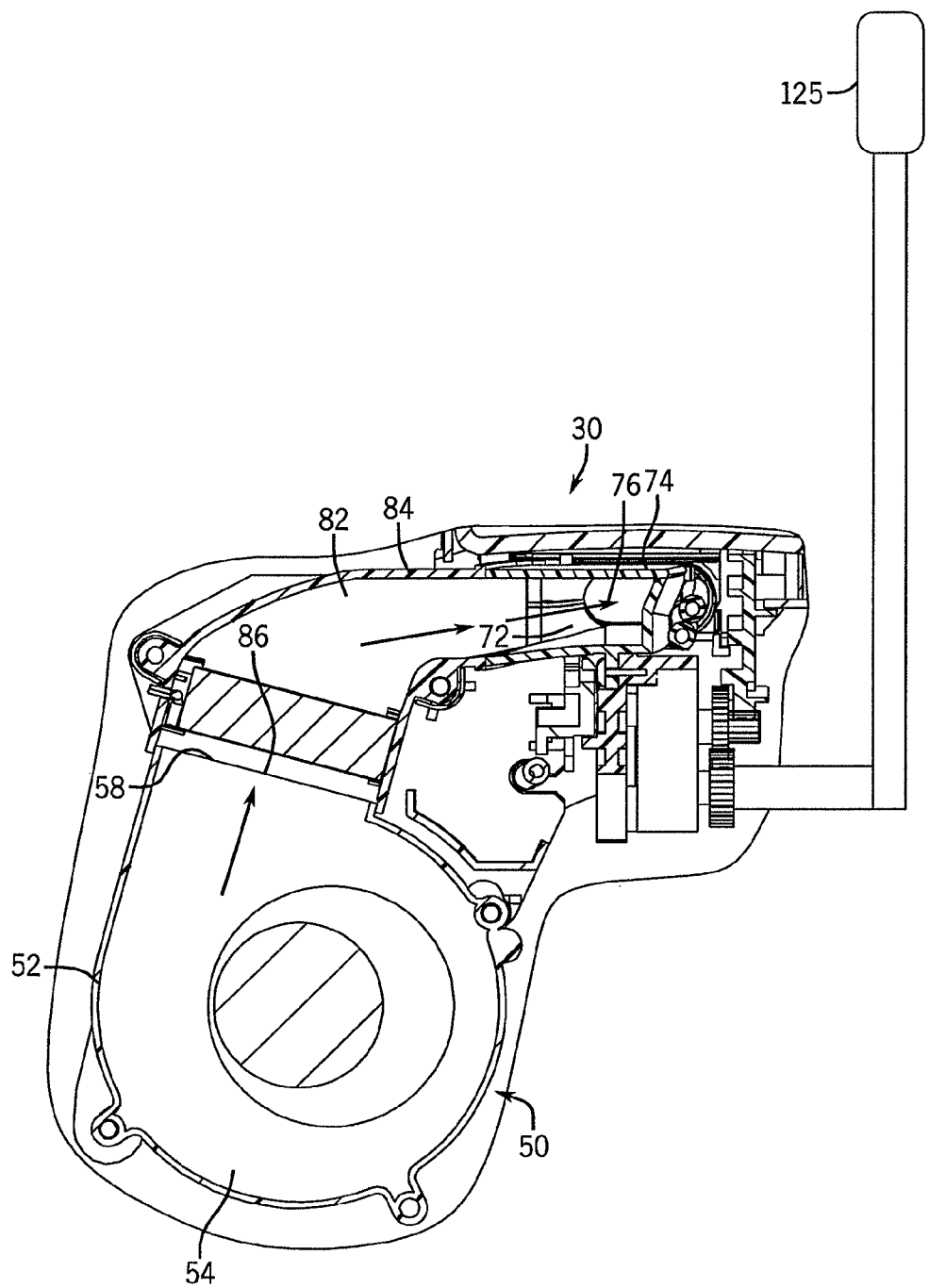
FIG. 10 is a partial, sectional perspective view of another dryer component.

In the embodiment shown in FIG. 8, the first part 72 is connected to a driving device 25, such as a motor, an actuator or a manually operated device, with the second part 82 fixed and stationary. A manually operated device can be a crank, a joystick or a handle, for example. FIG. 10, for example, shows a bidet equipped with a rotary rod, for example, which serves as the driving device 25. In varying alternative embodiments, the second part 82 can be optionally connected to the driving device 25 with the first part 72 fixed and stationary, or the first part 72 and the second part 82 are both immovably fixed, or both connected to the driving device 25. As shown in FIG. 8, the drying member 40 is also connected to the driving device 25 with the drying member 40 in fully extended position. Alternatively, the drying member 40 can be fixed. The drying member 40 can further include an injection member (e.g., shown as a water sprayer at the tip of dryer member 40), as is shown is FIG. 8A. Such an injection member can be adapted for injecting water to certain body part of the user.

Figure 8A:
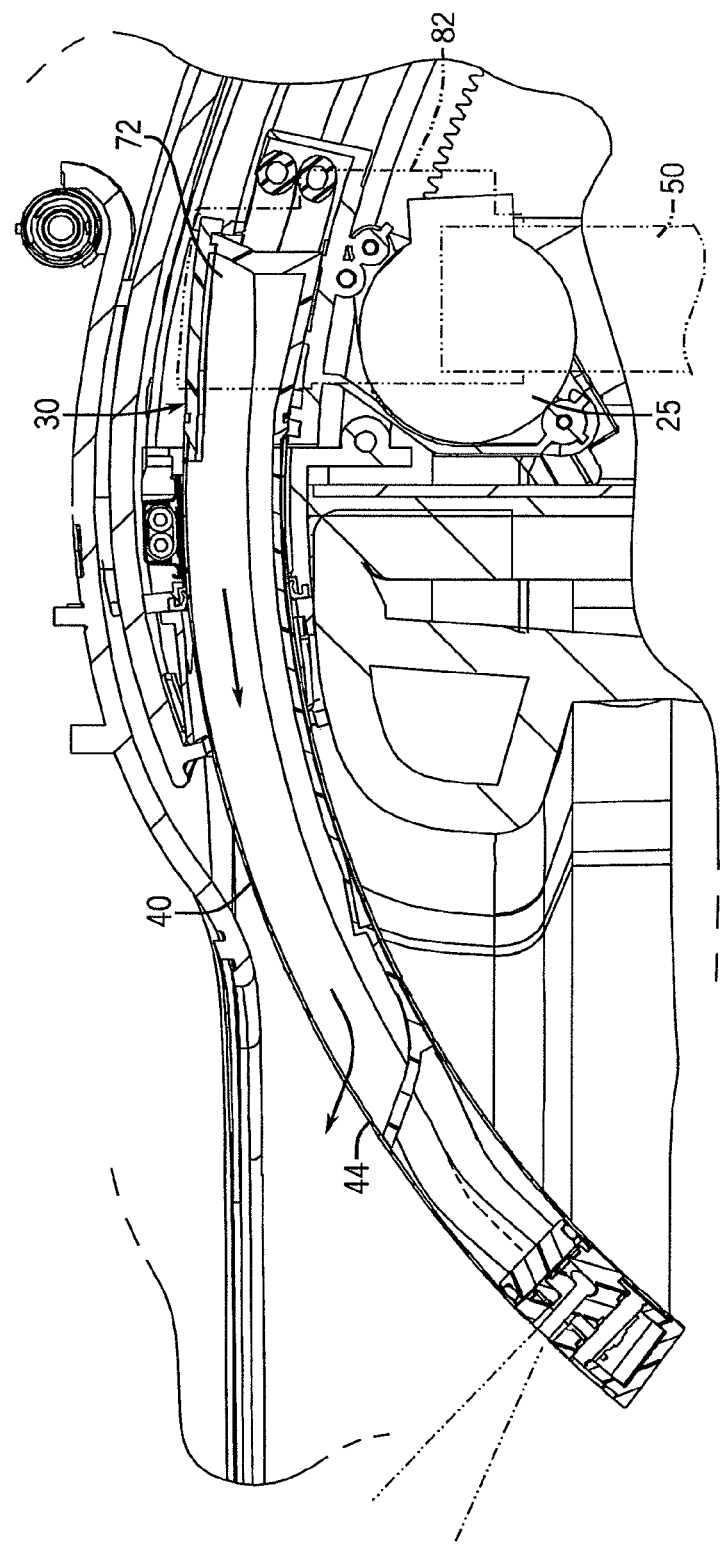
FIG. 8A is a partial, side sectional view of a bidet, including another embodiment of the dryer component.
Figure 9:
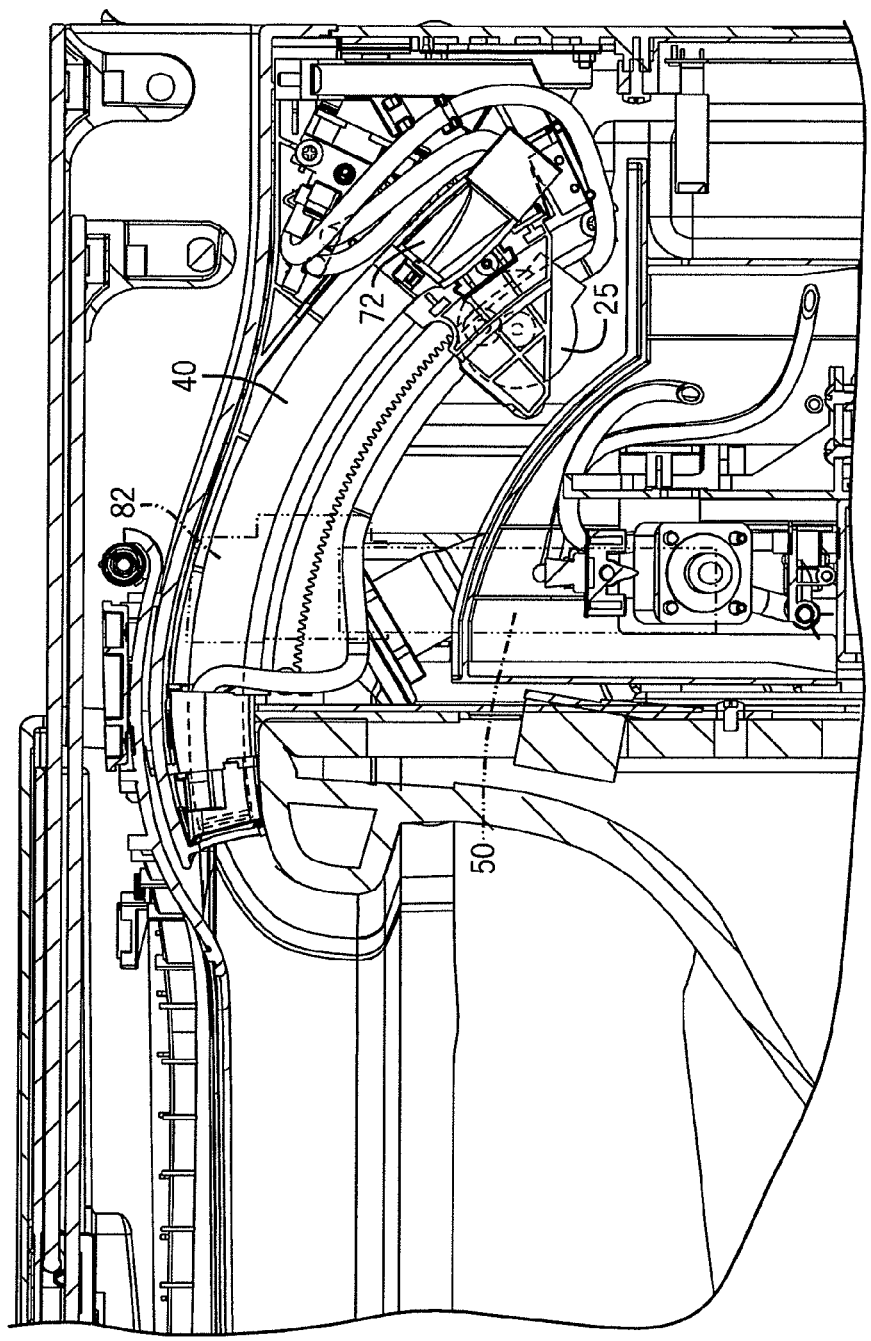
FIG. 9 is a partial, side sectional view of a bidet, including the dryer component as illustrated in FIG. 2 in the retracted position.

FIG. 9 shows a drying member 40 in fully retracted position and a first part 72. As shown in the embodiment, the first part 72 is separated from the second part 82 in the retracted position so that the first part 72 does not receive any airflow from the blower component 50 via the second part 82. The airflow is prevented from directly entering the first part 72 and thereby prevents the airflow from passing through drying member 40 and outlet 44. When a user (not shown) wishes to obtain airflow from the drying member 40, the user can activate driving device 25 so as to move the drying member 40 to the extended position as shown in FIG. 8A. In the extended position, the first fitting surface 80 is fitted with the second fitting surface 90 such that the gas can flow from the blower component 50 to drying member 40 via the pipe component 70. The blower component 50 can optionally rotate the airflow in reverse direction such that the gas can flow from the drying member 40 to the blower component 50 via the pipe component 70. The counter rotating airflow can make use of air to produce inhaling or vacuum effect.

Even if the first part 72 is not perfectly fitted with the second part 82, the airflow can be still guided through the outlet 44. For example, if the drying member 40 does not fully extend out, or one or both of the first part 72 and the second part 82 are misaligned. As long as the first part 72 is partially fitted with the second part 82, certain amount of airflow can still flow past the pipe component 70, whereby allowing users to continue employing the drying characteristic of the bidet until the misalignment is corrected.

FIG. 10 shows a dryer component, the ensemble of which is labeled as 30. Such dryer component is provided with a driving device 125, which is a manually operated device. The driving device 125 is a pivotal arm which is connected to at least one of the first part 72 and the second part 82. The driving device 125 can be manually rotated in one direction in order to move the first part 72 and the second part 82 to a position where the two parts fit each other. And the driving device 125 can be manually rotated in the countervailing direction in order to move the first part 72 and the second part 82 to a position, where the two parts do not fit with each other.

Figure 11:
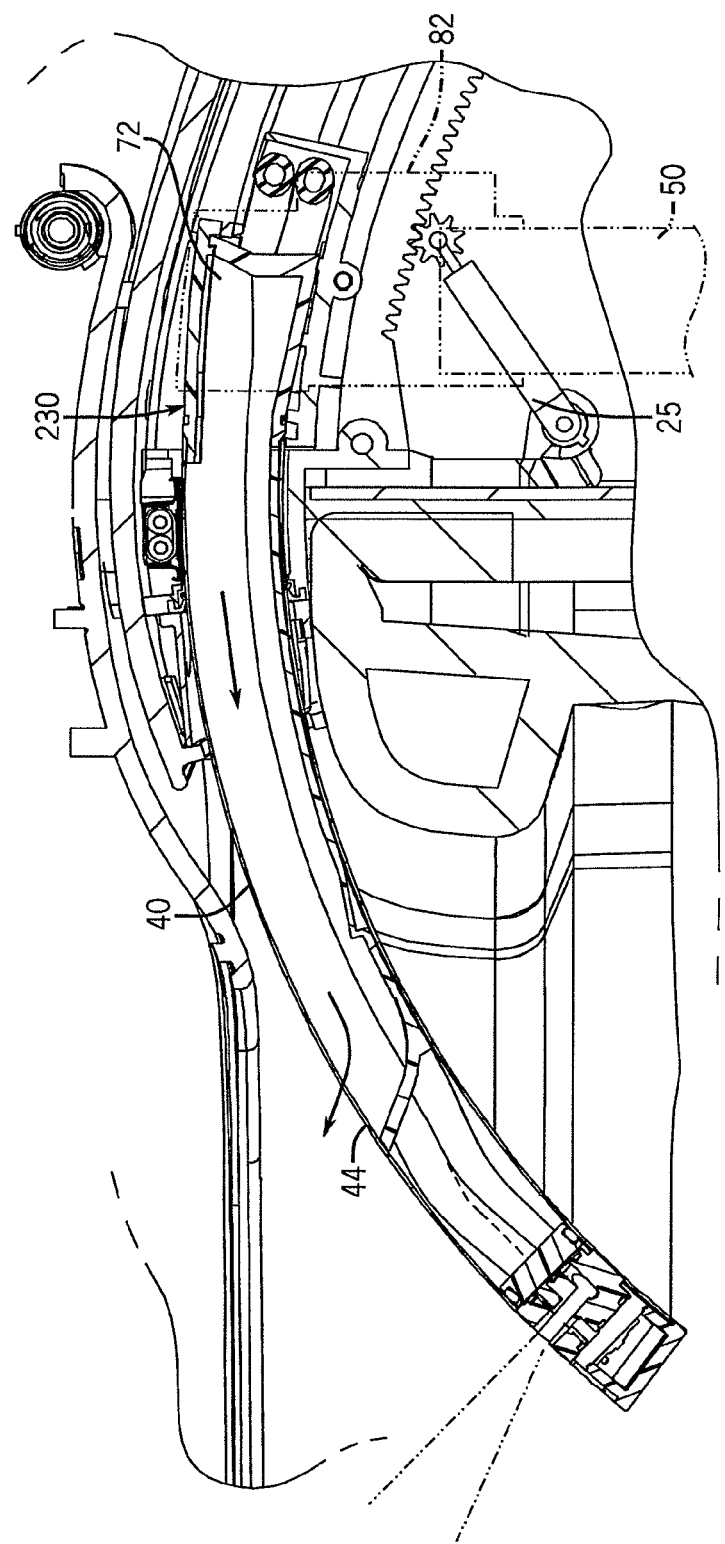
FIG. 11 is a partial, sectional perspective view of another dryer component.

FIG. 11 shows a dryer component, the ensemble of which is labeled as 230. Such dryer component is provided with a driving device 25, which is an actuator. The driving device 25 can be actuated in one direction in order to move the first part 72 and the second part 82 to a position where the two parts can fit with each other. The driving device 25 can be actuated in the countervailing direction in order to move the first part 72 and the second part 82 to a position, where the two parts do not fit with each other.

What is claimed is:

1. A dryer component for a bidet, comprising:
   a drying member having an inlet;
   a blower component configured to move an airflow; and
   a pipe component including a first part and a second part, the first part having a first fitting surface and the second part having a second fitting surface;
   wherein the first part is removably coupled to the drying member; and
   wherein the first part and the second part are demountably connected via first and second fitting surfaces to provide a fluid connection between the blower component and the inlet of the drying member.

2. The dryer component of claim 1, wherein the first and second fitting surfaces are tilted.

3. The dryer component of claim 1, wherein the drying member is a bidet wand.

4. The dryer component of claim 1, wherein the drying member is an arcuate wand.

5. The dryer component of claim 1, wherein the drying member further includes a liquid injection member configured to provide a stream of water from the dryer component.

6. The dryer component of claim 1, wherein the first part and the second part are substantially rigid.

7. The dryer component of claim 1, further comprising a heating element configured to warm the airflow.

8. The dryer component of claim 1, further comprising a driving device which is used for moving at least one of the first part and the second part to a connected position or a position wherein the fluid cannot be connected with each other.

9. The dryer component of claim 8, wherein the driving device is a motor.

10. The dryer component of claim 1, wherein the bidet does not include a flexible hose coupling the blower and the dryer component.

11. The dryer component of claim 1, wherein the first part of the pipe component is received in the inlet of the drying member.

12. A dryer component for a bidet, comprising:
    a drying member having an inlet;
    a blower component having an outlet and configured to move an airflow; and
    a pipe component including a first part detachably connected to a second part;
    wherein the first part is non-permanently coupled to the drying member;
    wherein the first part is fluidly connected to the inlet and the second part is fluidly connected to the outlet; and
    wherein when the first part is connected to the second part, the drying member is fluidly connected to the blower component, which is mountable to the bidet.

13. The dryer component of claim 12, wherein the first part includes a tab and the drying member includes a socket, and wherein the tab fits into the socket to connect the first part to the drying member.

14. The dryer component of claim 12, further comprising a driving device, wherein the drying member and the first part are movable between an extended position and a retracted position by the driving device.

15. The dryer component of claim 14, wherein the first part is separated from the second part in the retracted position, such that the first part is not fluidly connected to the second part.

16. The dryer component of claim 15, wherein when in the extended position, the first and second parts are fluidly connected.

17. The dryer component of claim 12, wherein the blower component moves the airflow from the blower component to the drying member to exit an outlet of the drying member.

18. The dryer component of claim 17, wherein the blower component can also move the airflow in a reverse direction, such that the airflow moves from the drying member to the blower component.

19. The dryer component of claim 12, wherein the first part of the pipe component is received in the inlet of the drying member.

20. A dryer component for a bidet, comprising:
    a drying member having an inlet;
    a blower component having an outlet and configured to move an airflow;
    a first part separately formed from and coupled to the drying member, the first part fluidly connected to the inlet;
    a second part fluidly connected to the outlet; and
    a driving device configured to move one of the first and second parts relative to the other of the first and second parts between a first position and a second position;

wherein when in the first position, the first and second parts are fluidly connected to allow the airflow to move from the blower component to the drying member; and wherein when in the second position, the first part is separated from the second part, such that the first and second parts are not fluidly connected.

21. The dryer component of claim 20, wherein the first part is received in the inlet of the drying member.

\* \* \* \* \*